(12) United States Patent
Hylton

(10) Patent No.: US 6,237,658 B1
(45) Date of Patent: May 29, 2001

(54) WORKPIECE GUIDE APPARATUS FOR WOOD ROUTERS, SHAPERS AND THE LIKE

(76) Inventor: Glen E. Hylton, 5131 Stonega Rd., Appalachia, VA (US) 24216

( * ) Notice: Subject to any disclaimer, the term of this patent is extended or adjusted under 35 U.S.C. 154(b) by 0 days.

(21) Appl. No.: 09/552,841

(22) Filed: Apr. 20, 2000

(51) Int. Cl.[7] .................................................. B27C 5/62
(52) U.S. Cl. .................................. 144/253.2; 144/253.1; 144/253.5
(58) Field of Search ............................. 144/134.1, 135.2, 144/253.1, 253.2, 253.5

(56) References Cited

U.S. PATENT DOCUMENTS 2,699,804 * 1/1955 Starnes .............................. 144/250.2

* cited by examiner

Primary Examiner—W. Donald Bray

(57) ABSTRACT

A guide apparatus for workpieces being run thru machines such as wood-shapers or the like having guide fences, wherein the apparatus has elongated support rail structure having attachment clamps for quickly and easily removably affixing the apparatus to a wood cutting machine, wherein workpiece restraining structure is mounted on said rail structure for quick and easy vertical and lateral position adjustment with respect to a workpiece and the fence to provide a precision path for the workpiece thru the machine.

4 Claims, 3 Drawing Sheets

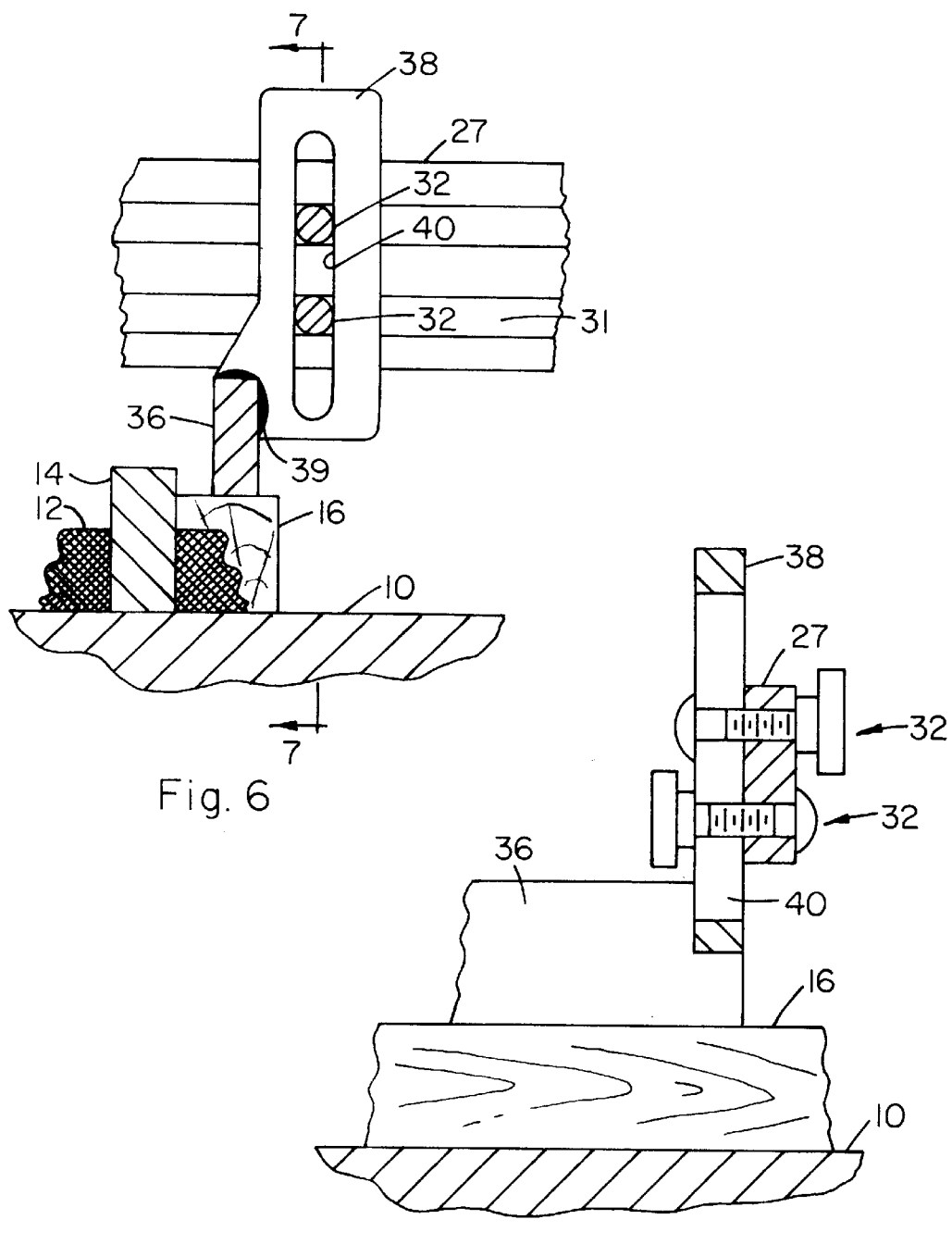
Fig. 6
Fig. 7
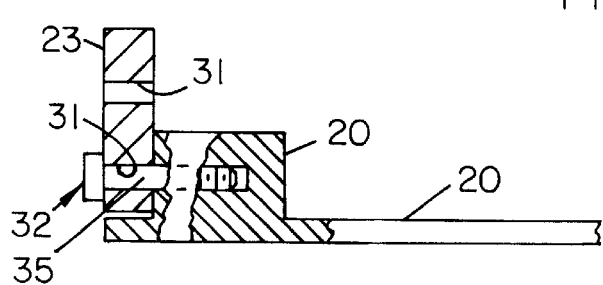
Fig. 8

WORKPIECE GUIDE APPARATUS FOR WOOD ROUTERS, SHAPERS AND THE LIKE

BACKGROUND OF THE INVENTION

1. Field

This invention concerns a workpiece guide apparatus, particularly for guiding wood thru wood cutting machines including routing, shaping, planning, sanding or the like machines which are provided with guide fences, wherein the apparatus is easily attachable to the machine at any desirable attachment location thereon and wherein a workpiece restraining means is provided on the apparatus and mounted for quick and easy position adjustment with respect to the workpiece and fence.

2. Prior Art

Various workpiece guide or restraining structures have been proposed for use on such machines but have limited utility due to one or more negative features such as complexity and cost of construction, relatively small workpiece contact and guiding surface area, difficult means for attaching the guide structure to the machine, or inability to removably affix the guide structure to any desired location on the machine without any modification of the machine table construction. Such structures are shown in U.S. Pat. Nos. 3,172,417; 2,699,804; 5,301,726; 5,165,458; 4,655,268; 4,304,276, the disclosures of which in regard to woodworking machine general constructions are hereby incorporated herein by reference.

SUMMARY OF THE INVENTION

The present invention of guide apparatus is summarized in a broad context as elongated support rail structure having attachment means for quickly and easily removably affixing said apparatus to a wood cutting machine having a guide fence, wherein workpiece restraining structure is mounted on said rail structure for quick and easy vertical and lateral position adjustment with respect to a workpiece and said fence.

BRIEF DESCRIPTION OF THE DRAWINGS

The invention will be further understood from the drawings herein and description of preferred embodiments, wherein certain structures are proportionately enlarged or broken away for descriptive clarity, and wherein:

FIG. 6 is a cross-sectional view taken along line 6—6 in FIG. 1 in the direction of the arrows but showing an independent lateral and vertical adjustment means for the hold-down bar means;

FIG. 7 is a cross-sectional view taken along line 7—7 in FIG. 6 in the direction of the arrows; and FIG. 8 is a partially cross-sectioned view taken along line 8—8 in FIG. 1 in the direction of the arrows.

DETAILED DESCRIPTION

Figure 1:
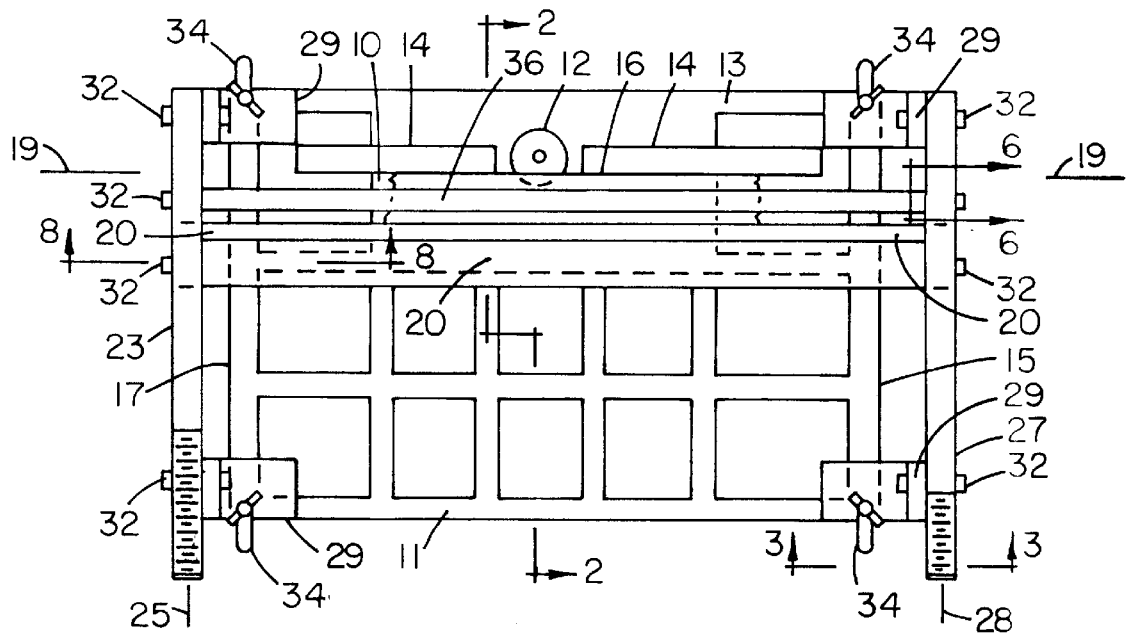
FIG. 1 is a top view of one preferred embodiment of the present apparatus as mounted outboard on a shaper top surface.
Figure 2:
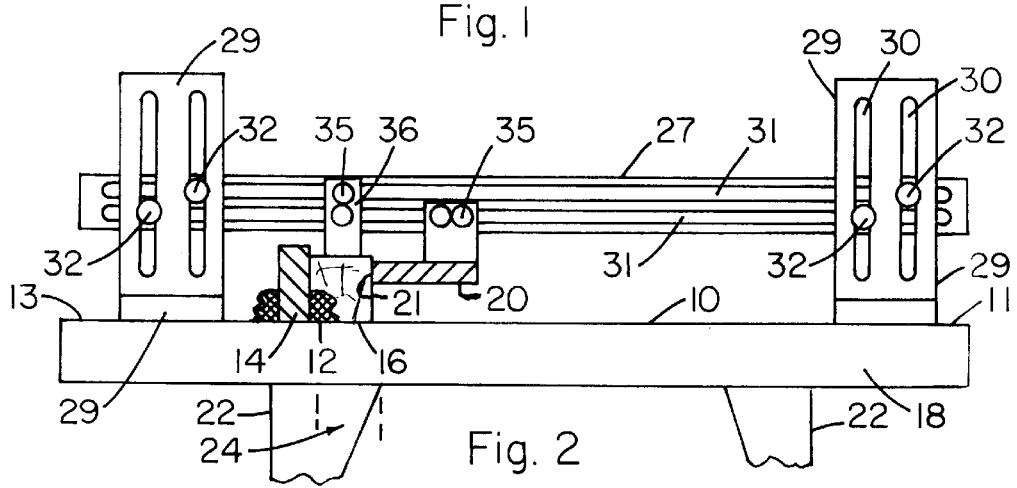
FIG. 2 is a cross-sectional view taken along line 2—2 in FIG. 1 in the direction of the arrows.

The present invention will be understood further from the following detailed description of certain preferred embodiments with particular reference to the drawings and claims hereof wherein the present apparatus is shown in use with a wood shaping machine having a top or deck 18 supported by leg means 22 and formed with a work surface 10 having a front portion 11, a rear portion 13, and first 15 and second 17 side portions and a pilot or guide fence 14 which is adapted for positioning on said surface 10 with respect to a wood cutting tool 12 mounted on said machine and extending above said surface 10 to provide a cutting depth axis 19 alongside said fence.

The apparatus, in one embodiment comprises frame means having a pair of elongated support rail means 23 and 27 having slide axes 25 and 28 respectively adapted to be oriented substantially normal to said cutting axis. Attachment means 26 comprising brackets 29 are provided on said rail means for attaching said rail means to said machine. The brackets are formed with slots 30 which intersect with slots 31 in the rails, and bolt means 32, preferably carriage bolts with wing nuts 33, are mounted thru the slots These brackets are held onto the work surface by any quick release means including C-clamps 34 or the like. An elongated lateral restraining bar means 20 having a workpiece contact surface 21 is slidably, adjustably mounted on said rail means for positioning laterally of said tool by bolt means 35 threaded into the ends of 20 and slidable in slots 31 or other such cooperating horizontal slide elements on said rail means and said bar means for allowing said bar means to be moved laterally toward and away from said cutting axis and locked into position to provide a gap 24 between said fence and contact surface 21 whereby a workpiece 16 can be slid thru said gap with precision regulated lateral clearance and with precision regulated positioning with respect to said fence.

A vertical restraining or hold-down bar 36 is laterally slidably mounted at its ends to the rail means 23 and 27 by bolt means 35 mounted thru slots 31 and threaded into said ends, which bolt means can be loosened to allow the bar 36 to be moved into a desired position over workpiece 16. The vertical adjustment of bar 36 can be made by raising or lowering the rails in brackets 29.

In another embodiment bar means 36 is slidably mounted both laterally and vertically on the rails by means as shown in FIGS. 6 and 7 wherein a bracket such as 38 is affixed as by welding at 39 to each end of bar means 36 and is slotted at 40 for slidably receiving bolt means such as 32. This construction allows independent adjustments of bars 20 and 36 both laterally and vertically with respect to the workpiece.

Figure 3:
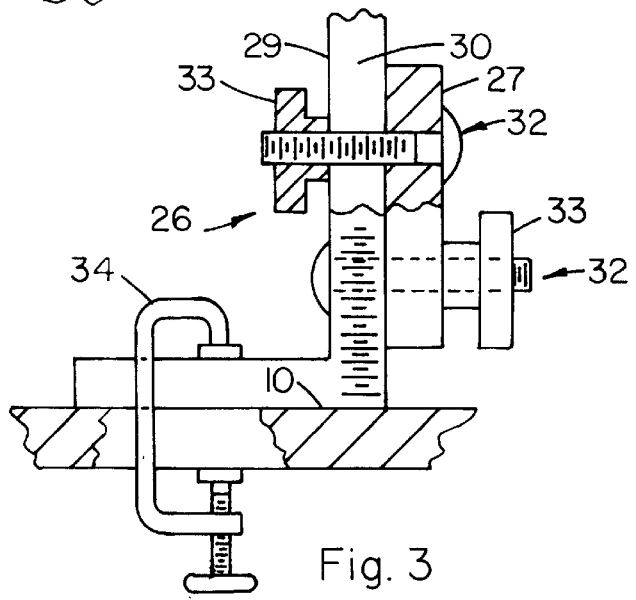
FIG. 3 is an enlarged, partially cross-sectioned view taken along line 3—3 of FIG. 1 in the direction of the arrows and showing a preferred position adjustment bolt and nut means for the rail means.

As shown in FIGS. 1 and 3, ruler tape or the like 41 is provided on appropriate edge or other portions of the rails or brackets for facilitating quick position adjustment of the bars on the apparatus.

Figure 4:
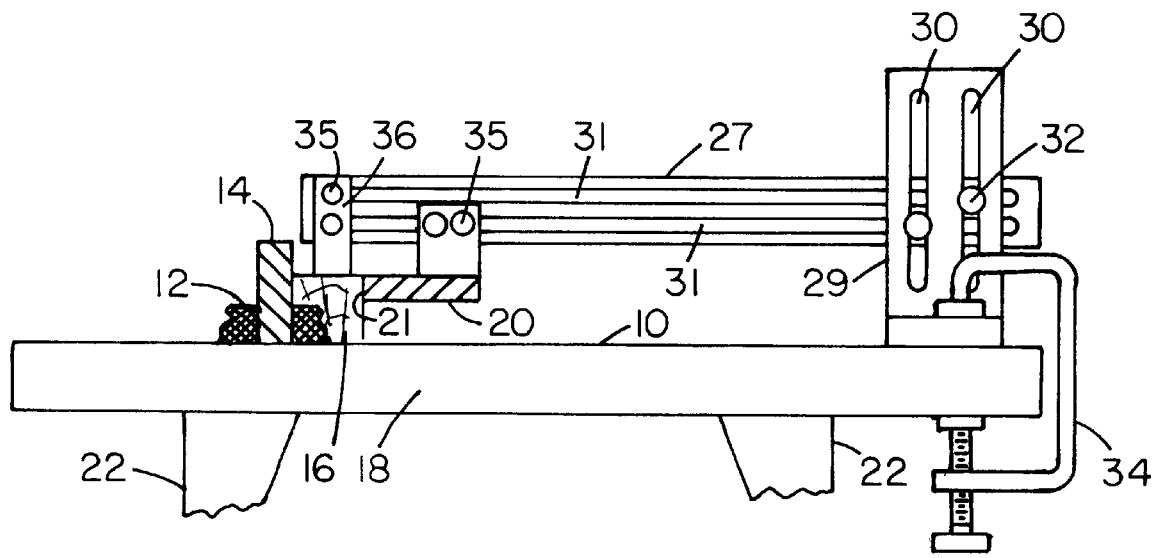
FIG. 4 is a view similar to FIG. 2 but showing an inboard mounted variation in rail structure and its positioning on the shaper.
Figure 5:
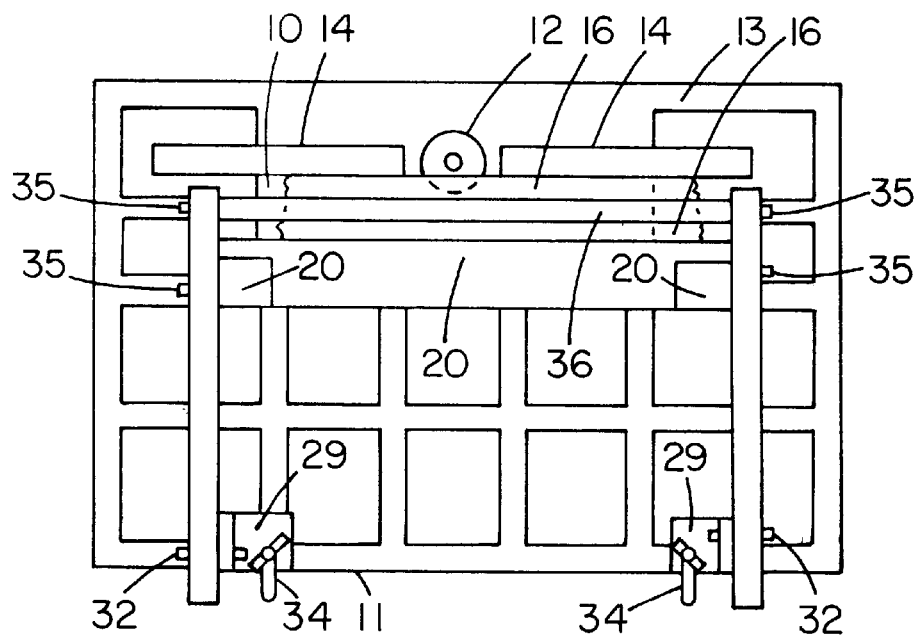
FIG. 5 is a top view of the structure of FIG. 4.

In the variation of FIGS. 4 and 5, only the front brackets 29 are employed and the rails are shortened if need be in order not to interfere with the fence. This variation reduces the overall width of the present apparatus.

The invention has been described in detail with particular reference to preferred embodiments thereof, but it will be understood that variations and modifications will be effected with the spirit and scope of the invention.

I claim:

1. A workpiece guide apparatus for use with a wood shaping machine for maintaining a precise positioning of a workpiece during its pass thru the machine, said machine having a top work surface with a front portion, a rear portion, and first and second side portions and a pilot fence which is adapted for positioning on said surface with respect to a wood cutting tool mounted on said machine and extending above said surface to provide a cutting depth axis alongside said fence, said apparatus comprising frame means having elongated support rail means having a slide axis adapted to be oriented substantially normal to said cutting axis, lateral restraining bar means mounted on said rail means, vertical restraining bar means mounted on said rail means, attachment means mounted on said rail means, cooperating lateral slide elements on said rail means and on said lateral restraining bar means and on said vertical restraining bar means for allowing both said bar means to be moved independently laterally along said rail means into desired positions with respect to said workpiece and said fence, cooperating lateral and vertical slide elements on said attachment means and rail means for positioning said attachment means at desired positions along said rail means and for positioning said rail means and both said bar means at desired vertical positions with respect to said workpiece, both said bar means, in combination, providing an adjustable workpiece pass gap for precision guiding said workpiece thru said machine.

2. The apparatus of claim 1 wherein said attachment means and rail means are provided with cooperating vertical slide elements for precisely positioning said hold-down means with respect to top portions of said workpiece.

3. The apparatus of claim 1 wherein said rail means is configured to stop short of said fence, and both said bar means are dimensioned in length to reside inboard of said first and second side portions of said top work surface whereby the overall dimensions of said apparatus can be minimized.

4. The apparatus of claim 1 wherein said cooperating slide elements comprise slot means and bolt means slidable and lockable in position therein.

* * * * *